Patented Feb. 27, 1940

2,191,674

UNITED STATES PATENT OFFICE 2,191,674

BASIC TRIARYLMETHANE DYES

Werner Müller, Cologne, and Wilhelm Schepss, Leverkusen I. G.-Werk, Germany, assignors to General Aniline & Film Corporation, a corporation of Delaware No Drawing. Application March 23, 1939, Serial No. 263,670. In Germany March 28, 1938

7 Claims. (Cl. 260—391)

The present invention relates to basic dyestuffs of the triarylmethane series and to a process of preparing the same.

It has been known that by introduction of higher alkyl radicals, such as propyl, butyl groups and others into the triaryl methane molecule, dyestuffs are obtained which, in comparison with the known dyestuffs containing, for instance, methyl or ethyl radicals, show an increase of the clearness of the shades and a desired shifting of the shade to the long wave side of the spectrum. In U. S. Patents 1,876,842 and 1,959,455 dyestuffs of the diaminotriphenylmethane series are described, which are obtained from benzaldehyde disulfonic acids and higher monoalkylated arylamines.

In the series of the basic triarylmethane dyestuffs the solubility decreases by introducing higher alkyl radicals with increasing length and arborescence so strongly that a technical use is no longer possible. Indeed, it is possible to overcome this deficiency by the process described in U. S. Patent 1,898,523, i. e. by using in the synthesis of the dyestuffs such arylamines as contain besides a higher alkyl radical a hydroxy alkyl group linked to the nitrogen atom; however, in this way only hydroxy alkyl dyestuffs are obtainable, while all other possibilities, chiefly also the use of secondary aromatic amines with higher alkyl radicals, are excluded.

Now the surprising observation has been made that likewise well soluble higher alkylated basic triarylmethane dyestuffs with the desired properties are also obtained, even if hydroxy alkyl radicals are absent, by selecting the components for their preparation in such a way that the dyestuffs formed contain at least once in the molecule a secondary butyl radical linked to the nitrogen atom. This could be the less foreseen, since just branched chains as, for instance, the isopropyl iso- and tertiary butyl groups reduce the solubility so that often not even the leuco compounds can be satisfactorily oxidized to the dyestuffs.

This property of the secondary butyl group to increase the solubility is, therefore, an exception which could not be expected. This could not be inferred from U. S. Patent 1,876,842, because this specification relates to the manufacture of acid dyestuffs, the solubility of which is caused by the presence of several sulfonic acid groups in the molecule. Nor does U. S. Patent 1,898,523 disclose this knowledge, for in the process described in this specification only the normal primary butyl radical is used and a solubility sufficient for practical purposes is obtained by means of hydroxy alkyl groups. Thus, it has also been proved that the "secondary-butyl-hydroxy-alkyl" dyestuffs show in comparison with the isomeric "primary butyl-, iso-, and tertiary butyl-hydroxy-alkyl" dyestuffs a better solubility.

It is now possible not only to combine the butyl radical with alkyl groups other than the hydroxy alkyl radicals, but also to prepare, for the first time, well soluble basic triarylmethane dyestuffs from secondary mono-butyl-aryl-amines and thus to utilize technically the favorable effect of the higher alkyl radicals in such dyestuffs.

The new dyestuffs can be prepared by methods which are usually employed in the manufacture of triarylmethane dyestuffs. A special advantage hereby is the fact that the dyestuffs are obtained in a very good yield.

In comparison with the combinations hitherto known the new dyestuffs mostly show clearer shades. The fastness to light of the dyeings and of the precipitations with lake-forming agents, such as tannin, tartar emetic, fuller's earth, phospho-tungsto-molybdic acids and so on, is, compared with the fastness to light of the best products on the market, substantially increased.

The following examples illustrate the invention without, however, limiting it thereto, the parts being by weight.

Example 1

81.4 parts of sec. butyl-o-toluidine and 35.4 parts of o-chlorobenzaldehyde are heated in a solution of 15 parts of water and 31 parts of sulphuric acid 60° Bé. to 105–110° C. until condensation is complete. After diluting with water and if necessary distilling with steam in order to remove excess base or aldehyde, the easily solidifying colorless leuco-base is obtained in almost theoretical yield. After recrystallizing from methyl alcohol, it melts at 103° C.

After oxidizing in the usual way in dilute sulphuric acid with lead peroxide and filtering from the formed lead sulphate, the dyestuff is salted out and if necessary redissolved from water. The dyestuff is obtained as a red bronze, easily soluble resin which during drying solidifies to greenish crystals. It corresponds to the following formula:

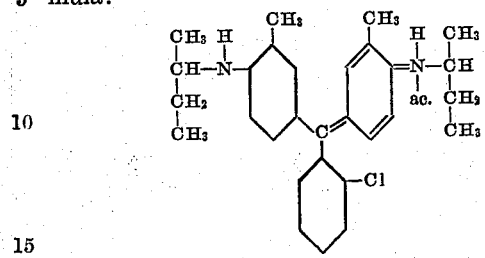

On cotton mordanted with tannic acid greenish blue dyeings are obtained which are distinguished by a particular clearness, beautiful evening color and better fastness to perspiration and water than the dyeings of the corresponding dyestuffs containing lower alkyl radicals. Compared with the analogous dyestuff from normal butyl-o-toluidine the new dyestuff shows the essential advantage of a good solubility; moreover, it is clearer.

Outstandingly brilliant blue dyeings are also obtained on wool, silk and acetate artificial silk.

The color lake obtained with phosphortungsto-molybdic acid is distinguished by an extraordinary clearness, very beautiful evening color, very good fastness to lime and spirit and a distinctly better fastness to light over the known products on the market.

Example 2

If in Example 1 o-chlorobenzaldehyde is replaced by the same quantity of p-chlorobenzaldehyde, a clear green is obtained the dyeings of which are distinguished by a better fastness to water and a distinctly better fastness to light in comparison with the dyeings of the dyestuff from benzaldehyde and dimethyl aniline. The dyestuff is essentially better soluble than the isomeric dyestuff from p-chlorobenzaldehyde and normal butyl-o-toluidine.

Example 3

30 parts of the dyestuff obtained according to Example 2 are stirred with 120 parts of p-phenetidine at 100° C. for several hours until the dyestuff has changed to a pure violet. The excess p-phenetidine is distilled off with steam, the remaining dyestuff is dissolved in acetic acid and salted out with sodium acetate. After filtering and drying the dyestuff is obtained in golden shining dark flakes which yield on cotton mordanted with tannic acid, a very clear violet of remarkably good fastness to light. The dyestuff of the following formula

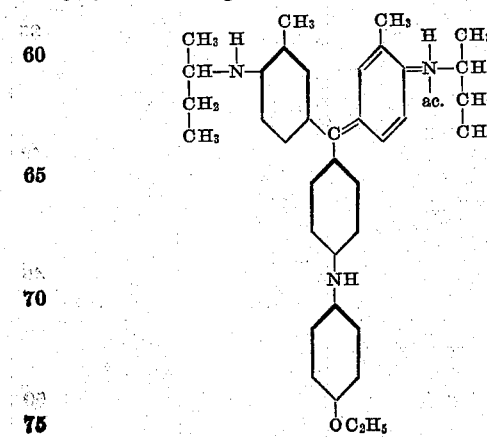

dyes essentially clearer shades than the corresponding dyestuff containing normal butyl radicals which latter on account of its low solubility goes only insufficiently and streakily on cotton mordanted with tannic acid.

Example 4

10 parts of p-diethylaminobenzaldehyde and 20 parts ethyl-sec.-butylaniline are boiled in the usual way in a solution of 12 parts of concentrate hydrochloric acid in 120 parts of water with stirring and reflux until the reaction is complete. Working up and oxidizing is carried out as described in Example 1. A golden shining resin of very good solubility is obtained; it corresponds to the formula

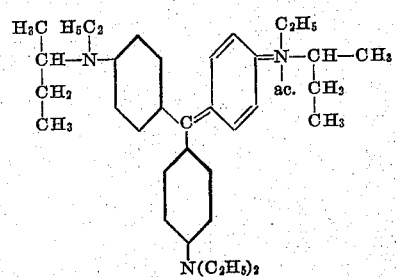

and dyes mordanted cotton clear violet shades. The dyestuff dyes mordanted cotton brighter and more reddish shades than the isomeric dyestuff from ethyl-normal-butylaniline.

Example 5

17.5 parts of ethyl-sec.-butylaniline and 7 parts of o-chlorobenzaldehyde are heated with 3 parts of water and 6 parts of sulphuric acid 60° Bé. with stirring until the condensation is complete. The leuco compound is isolated in the manner described above. After oxidizing and working up in the usual way by salting out with sodium sulphate the dyestuff is obtained as a red bronze resin which dyes the mordanted fiber pure green shades of greater clearness than the known dyestuff from o-chlorobenzaldehyde and dimethylaniline. The new dyestuff which corresponds to the formula

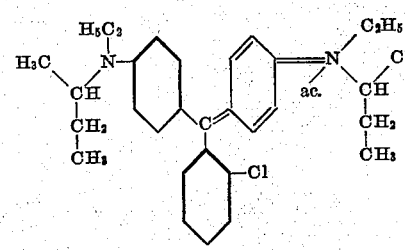

possesses a better solubility than the analogous dyestuff from ethyl-normal-butylaniline.

Example 6

54 parts of tetra-methyldiaminobenzhydrol and 38 parts of ethyl-sec.-butylaniline are boiled with 54 parts of 50% sulphuric acid for 24 hours with stirring and reflux. The excess base, if any, is distilled off with steam from sodium carbonate alkiline medium, the remaining leuco compound is filtered with suction and crystallized from methyl alcohol. The leuco compound melts at 113° C. The dyestuff obtained by oxidizing with lead peroxide dyes cotton mordanted with tannic acid very clear violet shades. The dyestuff corresponds to the formula

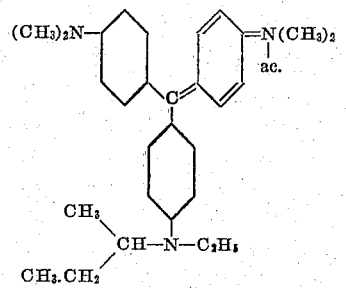

and its dyeings are redder and clearer than the dyeings of the dyestuff from tetramethyldiaminobenzhydrol and ethyl normal butylaniline and keep their shades better under the influence of light.

The same dyestuff is obtained when Michler's ketone is condensed in known manner with ethyl-sec.-butylaniline.

*Example 7*

12 parts of the aldehyde of the formula

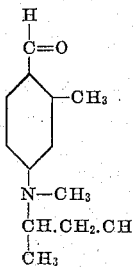

and 19.2 parts of sec.-butyl-o-toluidine are heated with 140 parts of water and 15 parts of concentrate hydrochloric acid for 70 hours, with stirring and reflux and the leuco compound is isolated in the usual way. Melting point 60° C.

The dyestuff obtained by oxidation dyes cotton mordanted with tannic acid redder shades than "Crystal Violet P", and is well soluble, although it contains 3 secondary butyl radicals. The new dyestuff corresponds to the following formula

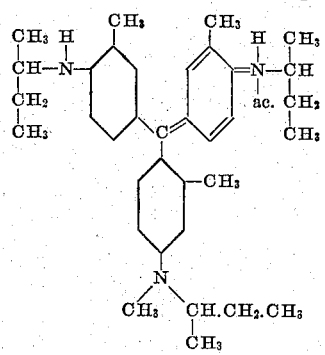

*Example 8*

20 parts of hydroxy-ethyl-sec.-butylaniline and 7 parts of o-chlorobenzaldehyde are heated with 3 parts of water and 6 parts sulphuric acid 60° Bé. to 105° C. with stirring until the condensation is complete. The leuco compound obtained as described in Example 1 melts after recrystallization from methyl-alcohol at 115° C.

After oxidizing and working up in the manner described, by salting out with sodium sulphate the dyestuff is obtained as a red bronze resin which dyes the mordanted fiber bluish green shades of greater clearness than the known dyestuff from o-chlorobenzaldehyde and dimethylaniline. The new dyestuff which corresponds to the following formula

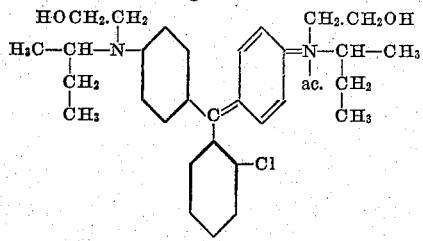

possesses a better solubility than the isomeric dyestuff from normal primary butylaniline.

*Example 9*

41 parts of hydroxy-ethy-sec.-butyl-m-toluidine are stirred with 10 parts of 30% formaldehyde and 0.5 part of 30% hydrochloric acid at 80° C. until the condensation is complete, thereupon dissolved in 200 cc. 10% sulfuric acid and filled up to 1000 cc. with ice and water. A paste containing 24 parts of lead peroxide is added, thereto, at 0° C., then the hydrol solution, which shows in the beginning a bluish coloration, is decolorized and 16 parts of sulfuric acid 66° Bé. and thereafter 16 parts of hydroxy-ethyl-sec.-butyl-m-toluidine are added and condensed on the boiling water bath until the reaction is complete. Now the lead sulfate is filtered off and the solution is run into very dilute excess sodium hydroxide solution, whereby the leuco compound is separated in the form of a resin. After pouring off the sodium hydroxide solution the leuco compound is ground with methyl alcohol and is thus obtained in form of colorless crystals of the melting point 186–187° C. In order to oxidize the product it is dissolved in dilute sulfuric acid, oxidized with the calculated quantity of lead peroxide, freed from lead sulfate by filtration and salted out by adding sodium sulfate. The dyestuff of the following formula

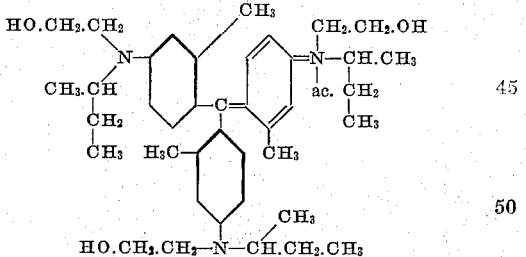

is obtained as bronze-colored powder which dyes cotton mordanted with tannic acid brilliant blue shades and is more easily soluble than the corresponding dyestuff from hydroxy-ethyl-normal-butyl-m-toluidine.

We claim:

1. As new products basic triarylmethane dyes containing in their molecule at least once a basic group of the formula

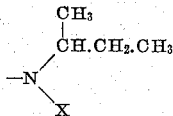

wherein X stands for one of the group consisting of hydrogen, alkyl and hydroxyalkyl.

2. As new products basic triarylmethane dyes containing in their molecule at least twice and up to three times a basic group of the formula

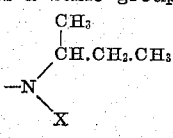

wherein X stands for one of the group consisting of hydrogen, alkyl and hydroxyalkyl.

3. As new products basic triphenylmethane dyes containing in their molecule at least once a basic group of the formula

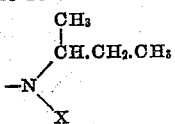

wherein X stands for one of the group consisting of hydrogen, alkyl and hydroxyalkyl.

4. As new products basic triphenylmethane dyes containing in their molecule at least twice and up to three times a basic group of the formula

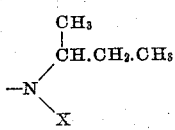

wherein X stands for one of the group consisting of hydrogen, alkyl and hydroxyalkyl.

5. As new product the basic triphenylmethane dye of the formula

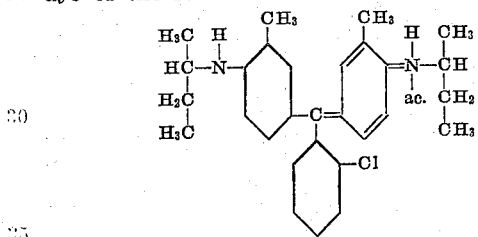

dyeing cotton mordanted with tannic acid clear greenish blue shades.

6. As new product the basic triphenylmethane dye of the formula

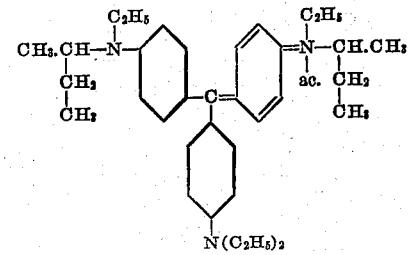

dyeing cotton mordanted with tannic acid clear violet shades.

7. As new product the basic triphenylmethane dye of the formula

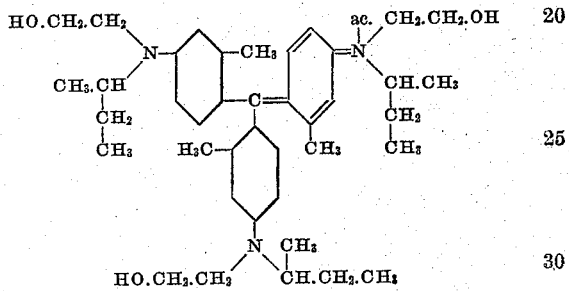

dyeing cotton mordanted with tannic acid bright blue shades.

WERNER MÜLLER.
WILHELM SCHEPSS.